United States Patent
Tat

(10) Patent No.: US 6,219,549 B1
(45) Date of Patent: Apr. 17, 2001

(54) RADIOTELEPHONE WITH SCANNING OF CHANNEL SIGNALS CONTAINING ACCESS RIGHTS

(75) Inventor: Nguyen Quan Tat, Surrey (GB)

(73) Assignee: Nokia Mobile Phones Limited, Salo (FI)

( * ) Notice: Subject to any disclaimer, the term of this patent is extended or adjusted under 35 U.S.C. 154(b) by 0 days.

(21) Appl. No.: 08/686,195

(22) Filed: Jul. 24, 1996

(30) Foreign Application Priority Data

Aug. 3, 1995 (GB) .................................................. 9515959

(51) Int. Cl.⁷ .............................. H04B 7/212; H04B 7/00
(52) U.S. Cl. .................... 455/434; 455/434; 455/425; 455/426; 370/347; 370/442
(58) Field of Search .................................. 455/434, 343, 455/436, 522, 63, 455, 464, 450, 513, 426, 465, 462, 515, 525, 509, 62; 370/442, 347, 344, 480, 350, 465, 503; 445/434, 458, 552, 553

(56) References Cited

U.S. PATENT DOCUMENTS

| | | | | |
|---|---|---|---|---|
| 4,281,413 | * | 7/1981 | Forrest | 455/34 |
| 4,672,657 | * | 6/1987 | Dershowitz | 379/63 |
| 4,977,611 | * | 12/1990 | Maru | 455/161 |
| 5,175,758 | * | 12/1992 | Levanto et al. | 379/57 |
| 5,199,031 | * | 3/1993 | Dahlin | 455/434 |
| 5,228,026 | * | 7/1993 | Albrow et al. | 455/465 |
| 5,394,391 | * | 2/1995 | Chen et al. | 370/18 |
| 5,408,684 | * | 4/1995 | Yunoki et al. | 455/434 |
| 5,416,779 | * | 5/1995 | Barnes et al. | 455/465 |
| 5,459,873 | * | 10/1995 | Moore et al. | 455/434 |
| 5,473,668 | * | 12/1995 | Nakahara | 455/465 |
| 5,533,027 | * | 7/1996 | Akerberg et al. | 455/515 |
| 5,537,414 | * | 7/1996 | Takiyasu et al. | 455/509 |
| 5,574,976 | * | 11/1996 | Schellinger | 455/434 |
| 5,606,548 | * | 2/1997 | Vayrynen et al. | 455/434 |
| 5,613,208 | * | 3/1997 | Blackman et al. | 455/434 |
| 5,754,956 | * | 5/1998 | Abreu et al. | 455/515 |

FOREIGN PATENT DOCUMENTS 2 285 555 * 7/1995 (GB) .

* cited by examiner

Primary Examiner—Daniel S. Hunter
Assistant Examiner—Meless N. Zewdu
(74) Attorney, Agent, or Firm—Perman & Green, LLP

(57) ABSTRACT

A method and apparatus for a handset are provided to select a channel for monitoring a system operating under a cellular radio telephone protocol supported by repetitive cellular radio systems. A base station transmits a signal packet having time slots and fields, which are recognizable by the handset. There is a selection of a carrier of a channel to scan in order to detect the packet. Upon finding a specified data field in the packet, there is a checking of a primary access right identity (PARI). Thereafter, the system may be found in order for the handset to lock onto the system, and, in the event that the system is not found, the procedure continues with a second pass which begins with a recording of received signal strength and secondary access right identity (SARI) information. In the second pass, there is again a selection of a carrier for scanning, this being obtained by use of information of the first pass. The scanning terminates in the event that there is a detection of the desired signal but continues in the event of a failure to determine compatibility between the handset and the system.

23 Claims, 4 Drawing Sheets

RADIOTELEPHONE WITH SCANNING OF CHANNEL SIGNALS CONTAINING ACCESS RIGHTS

BACKGROUND OF THE INVENTION

The invention relates to portable radio telephones and in particular to such telephones for communication with base stations in a digital cellular radio telephone system. The invention also relates to a method of operation of such radio telephones, frequently called handsets. The invention is concerned with 'locking on' to a digital cellular radio telephone system to allow communication with the system.

System information is typically transmitted over at least one channel at all times for users to obtain the information necessary to select a channel for communication. This may be one or more dummy signals transmitting at all times or just when there are no traffic channels. A handset wishing to lock on to a system must be able to find a channel on which the information required is being transmitted. In digital systems, in order to receive this information the handset must bit synchronise with the signal transmitted.

Every handset will have specific access rights to specific radio telephone systems. In order to set up a call on a channel (that is a combination of a carrier frequency and time slot), the handset must have the right of access to the particular system providing the channel. A handset is provided with one or more Access Right Keys (ARKs) that relate to a particular radio telephone system. The handset is able to lock on to any system that recognises one of the ARKs.

In prior art methods of locking on to a system, the handset assumes a reference frame having the same duration as a frame of the system and which is divided into the requisite number of time slots to provide a complete set of reference time slots. The reference time slots are not synchronised to the time slots of the system being monitored as the handset needs to find a signal being transmitted before synchronisation can occur. The handset monitors the RSSI of each of the reference channels by monitoring each timeslot of a carrier in turn. Once the RSSIs of all the reference channels have been determined the handset selects the reference channel with the highest RSSI, synchronises with the signal and reads the information being transmitted in that channel. The handset is then in a position to determine whether the access rights of the handset allow it to lock on to the system it is now monitoring.

The channel with the highest RSSI is likely to be the channel on which the system is transmitting a dummy bearer or a traffic channel. This is not, however, necessarily the case. A high RSSI could result from noise which may occur because of interference between channels of different systems. The handset will not, therefore, be able to lock on to the system. Even if the highest RSSI does indicate a transmission channel, it is not necessarily a channel on a system to which the handset has access rights. So in the same way that the handset cannot lock onto a noise channel selected as a result of a comparison of the RSSIs, the handset will be unable to lock on to a transmission channel of a system that does not allow the handset access.

If the handset is not able to lock on to the selected channel for any reason a problem arises. Because the reference channels are not synchronised with the transmission time slots of the system, as soon as the handset synchronises with the system to read information on the selected channel, the recorded RSSI information is no longer relevant to the new frame of reference of the handset. If the handset is reading noise it has lost its frame of reference altogether. If the handset is reading a signal from a system to which it is not allowed access, it has adopted the timing of that system. Under either set of circumstances, the handset cannot select a further channel based on the reference information it has previously recorded.

To make a new channel selection all the RSSI information must be gathered afresh. This is both time consuming, and power inefficient. In addition, if there is more than one system in the vicinity of the handset, once the handset has locked on to the one with the strongest signal and found it is not allowed access to that system, it will be difficult to disregard signals resulting from transmissions on channels resulting from that system in order to obtain information on signals from other systems that might also be in the vicinity.

SUMMARY OF THE INVENTION

In accordance with a first aspect of the present invention there is provided a radio handset for operating under a cellular radio telephone protocol supported by respective cellular radio systems in which the handset is operable for communication on a channel of the system if the handset and system are compatible, wherein the radio handset comprises processing means operative to cause signal channels defined by the protocol to be scanned for detecting signals indicative of access rights to the respective systems, the processing means being adapted to cause interruption of the scan in response to detection of a signal, and to cause the scan to continue in response to a failure to determine that the handset and the system transmitting the signal are compatible.

In accordance with a second aspect of the present invention there is provided a method for selecting a particular celluar radio telephone system compatible with a handset operable under a cellular radio protocol supported by respective cellular radio systems in which the handset is operable for communication on a channel of a particular cellular radio system if the handset and system are compatible comprising, scanning signal channels of the system for signals indicative of access rights to respective systems, interrupting scanning in response to detection of a signal, and continuing to scan in response to a failure to determine that the handset and system transmitting the detected signal are not compatible.

By a method or apparatus in accordance with the present invention, a determination regarding the compatibility between the handset and the system transmitting the detected signal is made each time a signal is detected. This is efficient for locking on as only relevant information is collected, reducing the time and power expended in finding a suitable system.

The handset and the system are compatible for the purposes of this application if the handset has a right of access to the system. This may be the result of an agreement between the handset user and the system provider.

The handset is understood to be 'locked on' for the purposes of this application when it has a right of access to the base station.

All the information necessary for locking on need not be read on a first scan of the available channels. Only a certain subset of information providing a first indication of the compatibility of the handset and the system may be considered. This has the advantage that the process can be faster than would otherwise be the case whilst still giving a high likelihood of successfully locking on. In those situations in which the initial scan does not establish that the systems are compatible, a second scan may be undertaken to look more closely at the signals transmitted by the system to determine if the two are in fact compatible.

Under the DECT protocol two access rights are transmitted by the system, primary and secondary access rights. In one embodiment of the invention, the handset determines if it is compatible with the system transmitting signals as a result of the primary access rights on the first scan or on the secondary access rights on a subsequent scan.

This allows the handset to determine relatively quickly if it is compatible with the primary access rights of any of the systems transmitting signals in its vicinity. The longer process of determining if it is compatible with the secondary access rights of the transmitting systems can be deferred until the search for a system with suitable primary access compatibility has been exhausted.

If the protocol defines transmission on a plurality of carrier frequencies in frames each comprising a predetermined number of time slots, the processing means may scan a carrier frequency for a predetermined time interval suitably of sufficient length to provide a high probability of detecting a signal. The carrier frequencies are suitably selected in sequence until a signal from a base station exhibiting the desired primary access right or other predetermined criterion is detected.

BRIEF DESCRIPTION OF THE DRAWINGS

A method and apparatus in accordance with the invention will now be described, by way of example, with reference to the accompanying drawings, in which.

DESCRIPTION OF THE PREFERRED EMBODIMENTS

Figure 1:
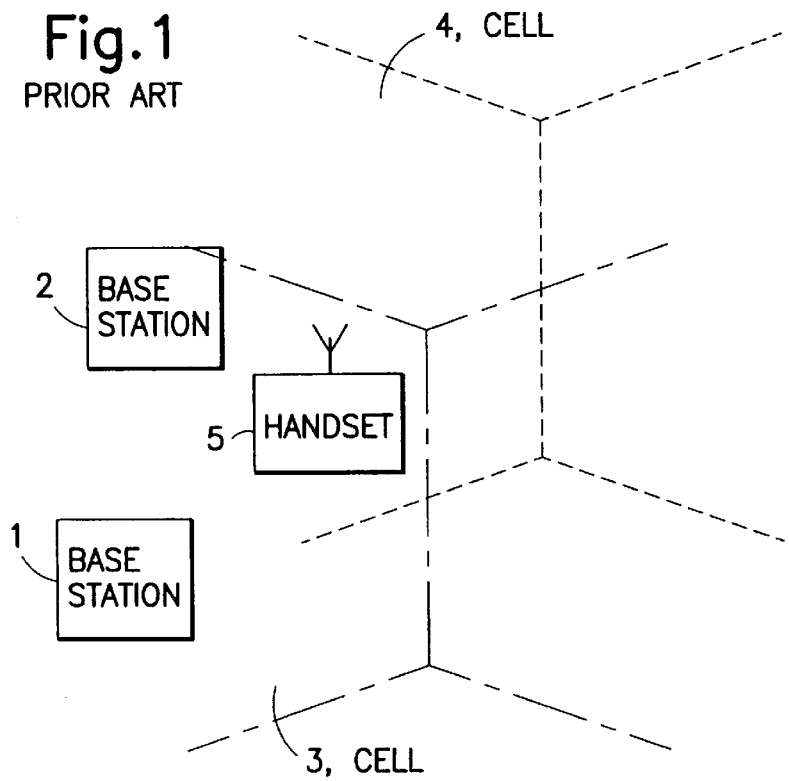
FIG. 1 is a diagram of overlapping radio telephone systems.
Figure 2:
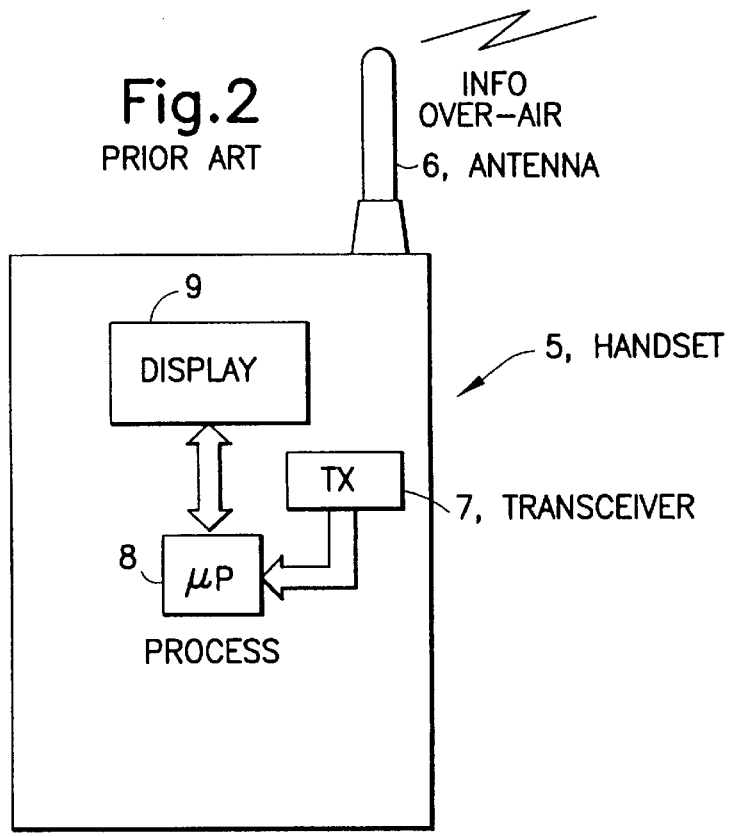
FIG. 2 is a handset for operating in the radio telephone systems of FIG. 1.

Referring to FIG. 1, the portion of the radio system depicted comprises two fixed base stations 1 and 2 of respective systems serving respective cells 3 and 4 representing overlapping geographical areas of coverage which may be inside or outside buildings. A user or subscriber to a system carries a portable handset 5 which may be capable of two-way radio communication with one or other of the system supported by base stations 1, 2, and/or with other base stations (not shown). Whether or not a handset is capable of communication with the base stations is dependent at least in part on the access rights allowed by the system. Before a handset can lock on to a system it must establish whether or not it has the right of access to the system. A handset, for example, within the coverage area of the base stations 1, 2 illustrated in FIG. 1, would detect signals from both systems and must then decide which system to lock on to.

In the described example shown in the drawings, the radio telephone system conforms to the DECT (Digital European Cordless Telecommunications) standard and uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset.

The handset 5 has an antenna 6, a transceiver 7 and processing means 8 programmed with an algorithm which is operative to lock on to the signals transmitted by a base station provided the handset and the base station are compatible. Information is displayed on a Liquid Crystal Display (LCD) 9. In order for the handset and the base station to be compatible the handset must have the appropriate access rights to the base station.

Each handset has at least one Portable Access Rights Key (PARK). Each system only allows handsets with predetermined PARKs to lock on. There are two messages that may be sent by a base station of a particular system that indicate which PARKs are compatible with the system. The first is a Primary Access Right Identity (PARI) and the second is a Secondary Access Right Identity (SARI). The PARI as its name suggests is the access given to handsets that will normally be using a particular system. SARIs allow access to handsets that may normally use a different system for example if there is an agreement such as a roaming agreement between the system provider and the handset owner.

Figure 3:
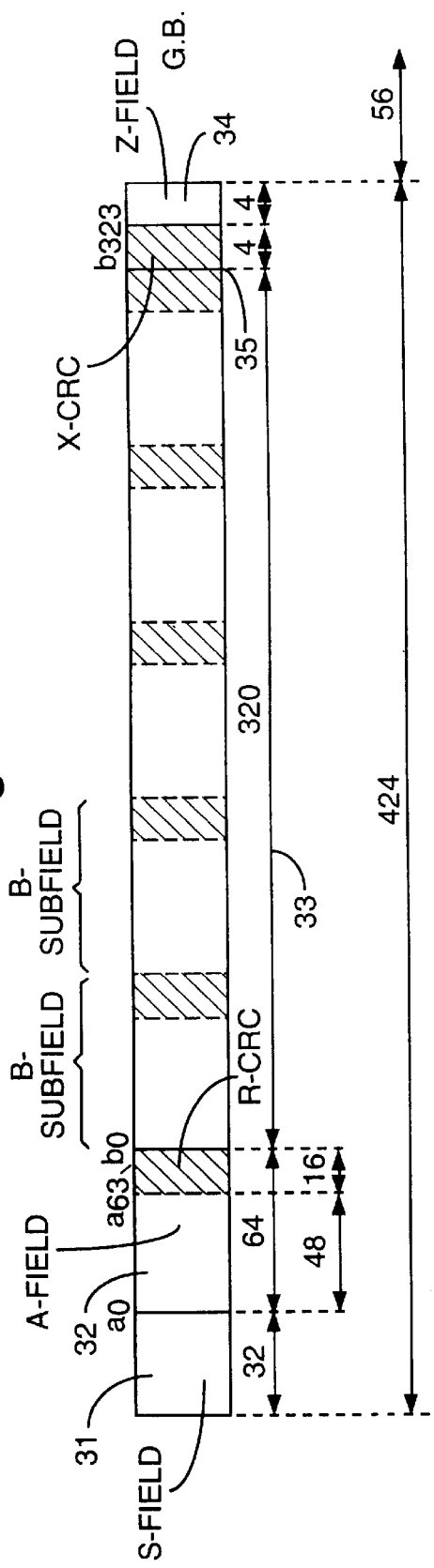
FIG. 3 is a schematic representation of a signal packet operating under the DECT protocol.

Base stations transmit a signal packet every frame. Each signal packet for transmission in one time slot of a frame is divided into four fields only one of which transmits system information. The signal packet structure is illustrated in FIG. 3. The S-field 31 used for synchronisation, and the A-field 32 used to send signalling information in accordance with the DECT protocol are both used when locking on. The B-field 33 is used for sending speech or data to a system user and the Z-field is provided specifically for sliding error detection. In addition to the Z-field, the A and B fields have their own error detection sub-fields known as Cyclic Redundancy Checks 35 (CRCs). The A-field is 64 bits long with the final 16 bits providing a error check on the preceding 48 bits. In each signal packet, therefore, only 48 bits are available for sending system information. In order to allow all the necessary information to be imparted to handsets, different types of message can be transmitted in respective frames. All the relevant information is transmitted periodically in a multiframe. A multiframe under the DECT protocol is sixteen consecutive frames. Some messages need to be transmitted more frequently than once every sixteen frames. The multiframe allows for flexibility in the transmission of messages so that some will be transmitted more frequently within the sixteen frame multiframe than others.

Two messages are of particular importance to the locking on process, the 'Nt' and the 'Qt' messages. The Nt message contains the PARI and a subtype of the Qt message contains SARIs. Whereas the PARI is transmitted relatively frequently within a multiframe, a SARI is transmitted infrequently. Some base stations will have a list of SARIs that will be transmitted in turn while others will transmit no SARIs at all. A single bit in the Nt message indicates whether SARIs are transmitted by a particular base station. A field in the Qt message specifies the number of SARIs transmitted by that base station.

If a base station transmits SARIs a single SARI will be transmitted in each Qt message. A handset determining whether a particular base station allows the handset access as a result of a secondary access right will have to wait for several multiframes in order to check each of the SARIs with its PARK to determine if access is allowed. The number of multiframes for which it must wait will be determined from the Qt message.

The lock on procedure can be divided into a first pass and a second pass. During the first pass the handset selects a carrier. The handset scans the carrier for a pre-specified time interval looking for an Nt message. The length of the time interval is selected so that the probability of detecting a Nt message is very high. Four frames is likely to be sufficient in most cases.

Figure 4:
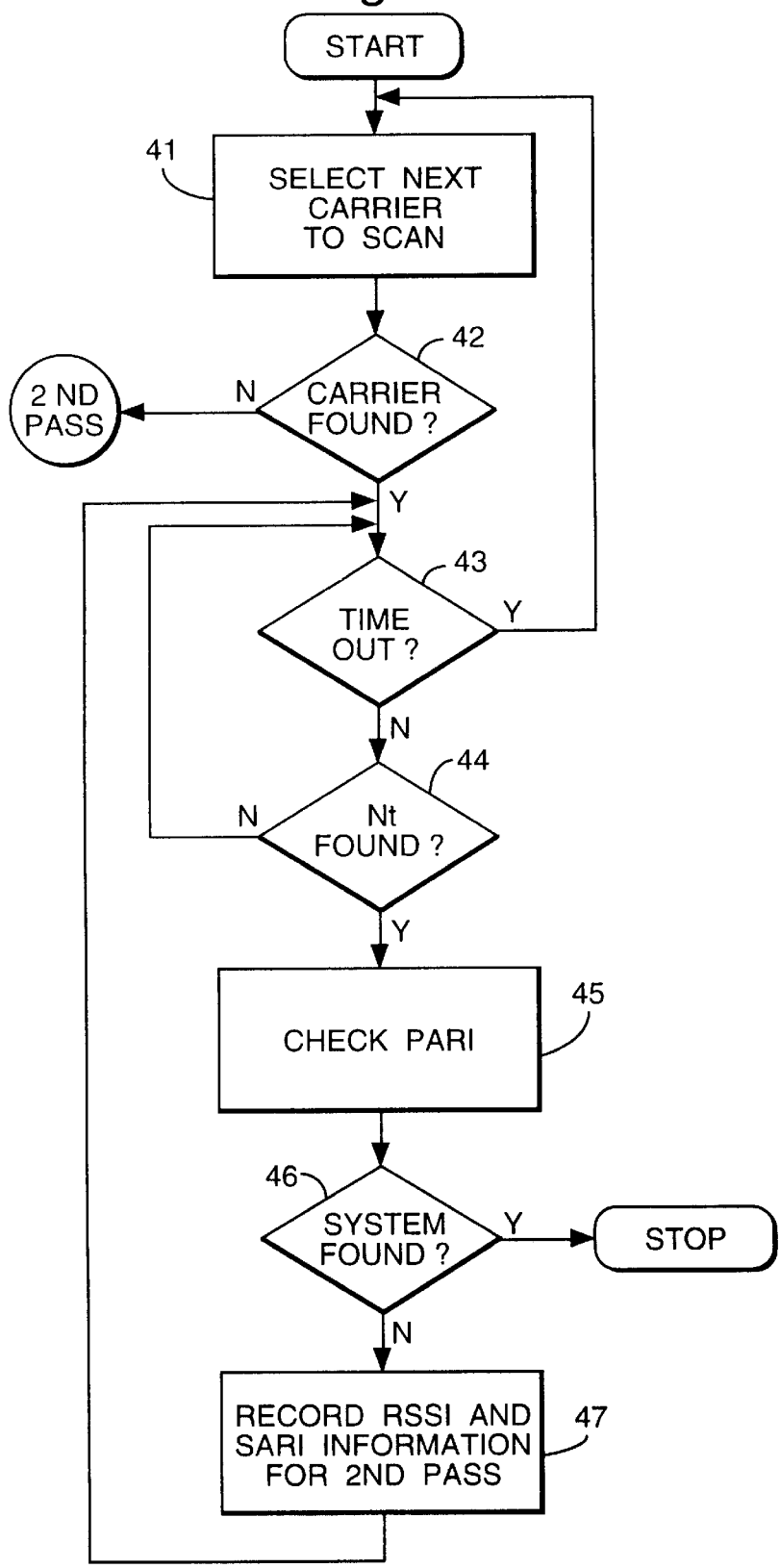
FIG. 4 is a flow chart of a first pass of a lock on method in accordance with the present invention.

FIG. 4 is a flow chart showing the steps of a first pass in an exemplary method in accordance with the invention. The handset first selects a carrier to scan 41, if a carrier is found 42, the handset checks to see if the scanning period has expired 43. If it has, the handset selects the next carrier and performs the same steps.

The handset searches for a signal. If a signal is found, the handset synchronises with the S-field of the signal packet and waits to receive the Nt message 44 to check the PARI 45. From the Nt message the handset is also able to determine if the carrier sends SARIs. It can then determine if it is worth returning to this carrier on a subsequent pass to look for a SARI compatible with its PARK if lock on is not completed in the first pass. The handset also notes the RSSI of the carriers if it is transmitting signals with SARIs to aid carrier selection on a subsequent pass. Once the PARI of the detected signal is received it is compared with the handset's PARK. If they are compatible the handset has found a suitable base station and is locked on 46. Otherwise the handset records the RSSI and SARI information 47 and resumes scanning the chosen carrier frequency for Nt messages until another is found or the pre-specified time period has elapsed. When the time period elapses, the handset selects the next carrier and follows the same procedure i.e. scanning for Nt messages and comparing the PARKs. This procedure continues until a compatible PARI is found or all the carriers have been scanned without finding a signal with a compatible PARI.

During the first pass the handset is able to identify those carriers that are not transmitting signals with synchronisation fields. It is also able to identify those carriers that are not transmitting signals with SARIs from the NT messages of detected signals. The handset can use this information in the second pass to cut down on the carriers that must be scanned to determine whether the handset is able to lock on as a result of secondary access rights. The stored RSSI information can also be used in selecting carriers in the second pass.

Figure 5:
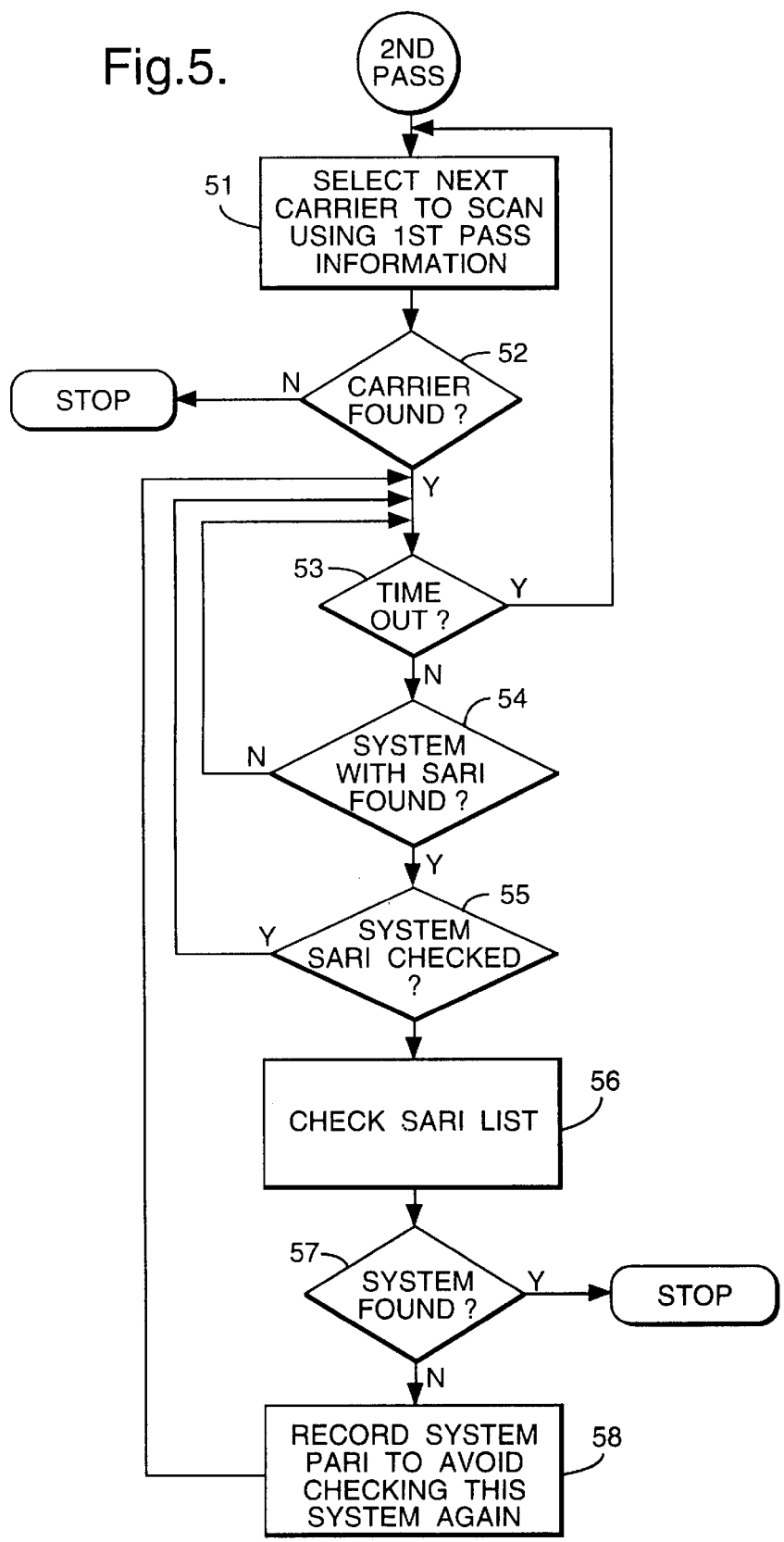
FIG. 5 is a flow chart of a second pass of a lock on method in accordance with the present invention.

In the second pass (FIG. 5) the handset selects a carrier, ignoring those identified as being unsuitable during the first pass and using the RSSI and SARI information obtained in the first pass 51. On the selected carrier the handset scans for a signal from a base station that sends SARIs. When a suitable carrier is found 52, the handset checks that the scanning period has not expired 53, and synchronises with the signal. The handset then receives the Nt message, and checks that the carrier is sending SARIs 54. It then checks to see if the SARIs of the system transmitting the signal have been checked before 55. If not it waits to receive SARIs in a Qt message. Each time a SARI is detected, it is compared with the handsets PARK or PARKs. If they are not compatible, the handset waits to receive further SARIs transmitted by the base station and repeats the process checking each received SARI against its PARK or PARKs in turn. When all the SARIs transmitted on a particular signal by a base station have been checked i.e. the number of SARIs indicated in the subtype of the Qt message have been received and the complete list of SARIs checked 56. If no compatible system has been found 57 the handset records the PARI of the base station 58 so that subsequently detected signals from that base station can be ignored and continues to scan for a signal from a different base station on that carrier.

When the time allotted to that carrier has elapsed 53, the handset selects the next carrier that has not been ruled out by the first pass and continues the process.

Once all carriers potentially carrying signals with compatible SARIs have been selected without finding a base station compatible with the handset it must be assumed that there is no suitable base station in the vicinity and lock on fails.

If during the first pass or second passes a detected PARI or SARI indicates that the handset and system transmitting a detected signal are compatible the handset is allowed access to the system, and is locked on. Once locked on the handset waits to receive further information in order to be in a position to select a channel for communication.

Although during bit synchronisation the handset determines the start and end of a slot so that messages such as the Nt and Qt messages can be received, the handset does not know which slot of a frame it is receiving. Once the slot number is known the handset is slot synchronised. The slot number is transmitted in a Qt message. This may be received during the second pass.

The handset also needs to know which frame of a multiframe it is reading i.e. it must frame synchronise with the base station. As a Qt message is always transmitted in frame 8 the handset may determine this at the same time as receiving SARIs.

The base station provides information on a 'primary scan number'. The primary scan number gives information on which carrier the system is currently scanning and can be used by the handset in selecting a carrier for a set up request. The handset receives this information to aid in call set up. It is also an advantage for the handset to gain an understanding of the capabilities of the base station so that handset features supported by the system can be utilised. Other information may also be received at this stage.

In view of the foregoing description it will be evident to a person skilled in the art that various modifications may be made within the scope of the invention in particular the invention is applicable for use under other protocols including Wireless Customer Premises Equipment (WCPE) and Personal Handyphone System (PHS).

The present invention includes any novel feature, or combination of features disclosed herein either explicitly or any generalisation thereof irrespective of whether or not it relates to the claimed invention or mitigates any or all of the problems addressed.

What is claimed is:

1. A radio handset for operating under a cellular radiotelephone protocol supported by respective digital cellular radio systems in which the handset is operable for communication on a channel of a radio system if the handset and the system are compatible for giving that handset a right of access to the system, wherein signal channels are defined by time slots of a protocol, and the radio handset comprises processing means operative to cause the signal channels defined by the time slots to be scanned for detecting signals indicative of access rights to the respective systems, the processing means defines the signal channels of respective ones of said cellular radio systems as time slots in a reference frame, and provides for synchronization of the handset to time slots in a digital signal packet transmitted by a base station of the radio systems, the processing means is adapted to cause interruption of the scan in response to detection of a signal indicative of an access right, and to cause the scan to continue in response to a failure to determine that the handset and the system transmitting the signal are compatible, and a scanning of successive channels on a carrier is preceded by selection of a carrier by the handset and is followed by synchronization and a reading of an access right.

2. A radio handset according to claim 1, wherein the processing means causes a plurality of carrier frequencies in frames each comprising a predetermined number of time slots to be scanned.

3. A radio handset according to claim 2, wherein the carrier frequencies are selected in sequence until a signal indicative of a compatible system is detected.

4. A radio handset according to claim 3, wherein the processing means causes each carrier frequency to be scanned for a predetermined time.

5. A radio handset according to claim 3, wherein the predetermined time interval is selected to provide a high probability of detecting a signal.

6. A radio handset according to claim 1, wherein the signals indicative of access rights comprise an indication of primary access rights.

7. A radio handset according to claim 6, wherein the processing means causes a determination of whether the handset is compatible with the system by virtue of primary access rights to be made on a first scan of the signal channels.

8. A radio handset according to claim 6, wherein the signals indicative of access rights comprise an indication of secondary access rights.

9. A radio handset according to claim 8, wherein on a second scan of the signal channels the processing means causes a determination of whether the handset is compatible with the system by virtue of secondary access rights to be made.

10. A radio handset according to claim 9, wherein on the first scan the processor causes a determination of whether signals indicative of the secondary access rights of the system are transmitted in a detected signal to be made.

11. A radio handset according to claim 7, wherein on the first scan, carrier frequencies on which no signals are being transmitted are identified.

12. A radio handset according to claim 10, wherein on the second scan those carrier frequencies on which no signals were identified on the first scan and those on which no signals carrying an indication of secondary access rights were identified on the first scan, are ignored.

13. A radio handset according to claim 8, wherein on the second scan, the processor means causes scanning to be interrupted to determine if the handset is compatible with secondary access rights transmitted in a detected signal.

14. A radio handset according to claim 8, wherein on the second scan the processing means causes systems that do not allow access to the system by virtue of secondary access rights to be identified.

15. A radio handset according to claim 14, wherein on the second scan, if a detected signal is determined to have come from a system which is not compatible with the handset by virtue of secondary access rights scanning resumes.

16. A method for selecting a particular digital cellular radio telephone system compatible with a handset operable under a cellular radio protocol supported by cellular radio systems in which the handset is operable for communication on a channel of a particular cellular radio system if the handset and the system are compatible for giving the handset a right of access to the system, comprising:

defining the signal channels of respective ones of said cellular radio systems as time slots in a reference frame;

scanning carrier frequencies of communication channels to find a channel;

providing for synchronization of the handset to time slots in a digital signal packet transmitted on a carrier by a base station of one of the radio systems;

scanning signal channels of the carrier for signals indicative of access rights to respective one of the systems;

interrupting scanning in response to detection of a signal indicative of an access right;

continuing to scan in response to a failure to determine that the handset and base station transmitting the detected signal are not compatible; and wherein a scanning of successive channels on a carrier is preceded by selection of a carrier by the handset and is followed by synchronization and a reading of an access right.

17. A radio handset for operating under a cellular radio telephone protocol supported by digital cellular radio systems in which the handset is operable for communication on a channel of a radio system if the handset and the system are compatible for giving the handset a right of access to the system, wherein the radio handset comprises:

means in the handset for selecting a carrier among multiple carriers, and processing means which define the signal channels of respective ones of said cellular radio systems as time slots in a reference frame, the processing means being operative upon a selected carrier to cause signal channels defined by time slots of the protocol to be scanned for detecting signals indicative of access rights to the respective systems;

wherein said selecting means is operative to select a further carrier upon a failure to detect a signal indicative of an access right within a predetermined time interval, the processing means providing for synchronization of the handset to time slots in a digital signal packet transmitted by a base station of the radio system;

the processing means is adapted to cause interruption of a scan of the signal channels in response to detection of a signal indicative of an access right, and to cause the scan of the signal channels to continue in response to a failure to determine that the handset and the system transmitting the signal are compatible; and a scanning of successive signal channels on a carrier is preceded by selection of a carrier by the handset and is followed by synchronization and a reading of an access right.

18. The radio handset according to claim 17, wherein said selecting means is operative to identify carriers wherein said access right is absent, and to store access-right information to avoid future interrogation of carriers known to have no access right.

19. A method for selecting a particular digital cellular radio telephone system compatible with a handset operable under a cellular radio protocol supported by cellular radio systems in which the handset is operable for communication on a channel of a particular cellular radio system if the handset and the system are compatible for giving the handset a right of access to the system, comprising the steps of:

defining the signal channels of respective ones of said cellular radio systems as time slots in a reference frame;

scanning carrier frequencies of multiple communication channels to find a communication channel at a selected carrier frequency;

providing for synchronization of the handset to time slots in a digital signal packet transmitted in the communication channel by a base station of the radio systems;

scanning signal fields of the communication channel for signals indicative of access rights to respective systems;

interrupting scanning of the signal fields in response to detection of a signal indicative of an access right;

continuing to scan the carrier frequencies in response to a failure to determine that the handset and system transmitting the detected signal are not compatible; and wherein a scanning of successive fields on a communication channel of a selected carrier is preceded by selection of a carrier by the handset and is followed by synchronization and a reading of an access right.

20. A method according to claim 19, further comprising steps of storing data are access-right information carried by individual ones of said carriers, and interrogating carriers known to have access rights.

21. A radio handset for operating under a cellular radio telephone protocol supported by digital cellular radio systems in which the handset is operable for communication on a channel of a radio system if the handset and the system are compatible for giving the handset a right of access to the system, wherein the radio handset comprises:

processing means which define the signal channels of respective ones of said cellular radio systems as time slots in a reference frame, the processing means being operative to cause signal channels defined by time slots of the protocol to be scanned for detecting signals indicative of access rights to the respective systems;

wherein the processing means provides for synchronization of the handset to time slots in a digital signal packet transmitted by a base station of the radio systems, the processing means being adapted to cause interruption of a scan of the signal channels in response to detection of a signal indicative of an access right, and to cause the scan to continue in response to a failure to determine that the handset and the system transmitting the signal are compatibles;

in response to detecting an access right indicative of the handset having a right of access with the respective systems, the handset attempts frame synchronization with the system; and a scanning of successive signal channels on a carrier is preceded by selection of a carrier by the handset and is followed by synchronization and a reading of an access right.

22. A method for selecting a particular digital cellular radio telephone system compatible with a handset operable under a cellular radio protocol supported by respective cellular radio systems in which the handset is operable for communication on a channel of a particular cellular radio system if the handset and system are compatible for giving the handset a right of access to the system, comprising:

scanning a succession of individual ones of carrier frequencies of multiple communication channels to find a signal indicative of the presence of an access right, the scanning of any one of said carrier frequencies being accomplished within a preset interval of time;

wherein, during a scanning of any one of said carrier frequencies, upon a finding of a signal indicative of the presence of an access right, synchronizing to the signal to enable a reading of the access right;

determining whether the access right found during the scanning of one of said carrier frequencies is a compatible access right that is compatible with the handset, wherein the method reverts to the scanning of a second of said carrier frequencies upon completion of said time interval or upon a determination that the access right is not compatible with the handset;

wherein, upon a determination that the access right is compatible with the handset, initiating a procedure for locking the handset to the telephone system.

23. A method according to claim 22, wherein said access right is a primary access right, said protocol provides also a secondary access right and, wherein, prior to said step of initiating a procedure for locking the handset to the system, there is a step of reading a secondary access right and a further step of determining whether the secondary access right is a compatible secondary access right compatible with the handset; and upon a failure to find a compatible secondary access right, the procedure for locking the handset terminates and the method reverts to a reading of another of said carrier frequencies to find a compatible secondary access right.

* * * * *